(12) United States Patent
Hammond et al.

(10) Patent No.: US 11,546,442 B2
(45) Date of Patent: Jan. 3, 2023

(54) EVENT TYPE-BASED NOTIFICATION FILTERING

(71) Applicant: Microsoft Technology Licensing, LLC, Redmond, WA (US)

(72) Inventors: Brian Hammond, Redmond, WA (US); Usman Zafar, Redmond, WA (US); Hesong Huang, Redmond, WA (US); Lucy Lin, Redmond, WA (US); Rajagopalan Ranganathan, Redmond, WA (US); Xiaoming Zhang, Redmond, WA (US); Dhrumil Patel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/779,066

(22) Filed: Jan. 31, 2020

(65) Prior Publication Data

US 2021/0243265 A1  Aug. 5, 2021

(51) Int. Cl.
*G06F 15/16* (2006.01)
*H04L 67/55* (2022.01)
*G06Q 50/00* (2012.01)
*G06F 3/04847* (2022.01)
(Continued)

(52) U.S. Cl.
CPC .......... *H04L 67/55* (2022.05); *G06F 3/04847* (2013.01); *G06F 9/542* (2013.01); *G06Q 50/01* (2013.01); *H04L 67/535* (2022.05)

(58) Field of Classification Search
CPC ......... H04L 67/26; H04L 67/22; G06F 9/542; G06F 3/04847; G06Q 50/01
See application file for complete search history.

(56) References Cited

U.S. PATENT DOCUMENTS 6,484,200 B1 *  11/2002  Angal ..................... H04L 41/12
                                                        709/224
9,503,873 B1 *  11/2016  Yadav ..................... H04W 4/08
(Continued)

*Primary Examiner* — Suraj M Joshi
*Assistant Examiner* — Jaren Means
(74) *Attorney, Agent, or Firm* — Nicholson De Vos Webster & Elliott LLP

(57) ABSTRACT

Technologies for filtering notification content based on event type are provided. The disclosed techniques include causing a plurality of notifications to be presented on a computing device, where the plurality of notifications includes a first notification of a first event type and a second notification of a second event type that is different than the first event type. A plurality of filters is caused to be presented on the computing device, where the plurality of filters includes a first filter that is associated with one or more first event types and a second filter that is associated with one or more second event types. An input that selects the first filter is then received. In response to receiving the input, the one or more first event types are identified. A strict subset of the plurality of notifications that are of one or more of the one or more first event types is identified from among the plurality of notifications. The strict subset of the plurality of notifications is then caused to be presented on the computing device without causing any notifications outside of the strict subset to be presented on the computing device.

23 Claims, 8 Drawing Sheets

(51) Int. Cl.
  *G06F 9/54* (2006.01)
  *H04L 67/50* (2022.01)

(56) References Cited

U.S. PATENT DOCUMENTS

| | | | |
|---|---|---|---|
| 2014/0179377 A1* | 6/2014 | Song | H04M 1/72403 |
| | | | 455/566 |
| 2015/0100977 A1* | 4/2015 | Shieh | H04N 21/47217 |
| | | | 725/28 |
| 2016/0191438 A1* | 6/2016 | Kao | G06F 3/04842 |
| | | | 709/206 |
| 2018/0158085 A1* | 6/2018 | Wohlwend | G06Q 30/06 |
| 2018/0248977 A1* | 8/2018 | Leydon | H04L 67/55 |
| 2018/0373398 A1* | 12/2018 | Seixeiro | H04M 1/724 |
| 2019/0342252 A1* | 11/2019 | Dascola | H04M 1/72484 |
| 2021/0064317 A1* | 3/2021 | Juenger | G09G 5/14 |

* cited by examiner

200

205
Causing a plurality of notifications to be presented on a computing device.

210
Causing a plurality of filters to be presented on the computing device, where the plurality of filters includes a first filter that is associated with one or more first event types and a second filter that is associated with one or more second event types.

215
Receiving input that selects the first filter.

220
In response to receiving input, identifying the one or more first event types.

225
Identifying, from among the plurality of notifications, a strict subset of the plurality of notifications that are of one or more of the one or more first event types.

230
Causing the strict subset of the plurality of notifications to be presented on the computing device without causing any notifications outside of the strict subset to be presented on the computing device.

Fig. 2

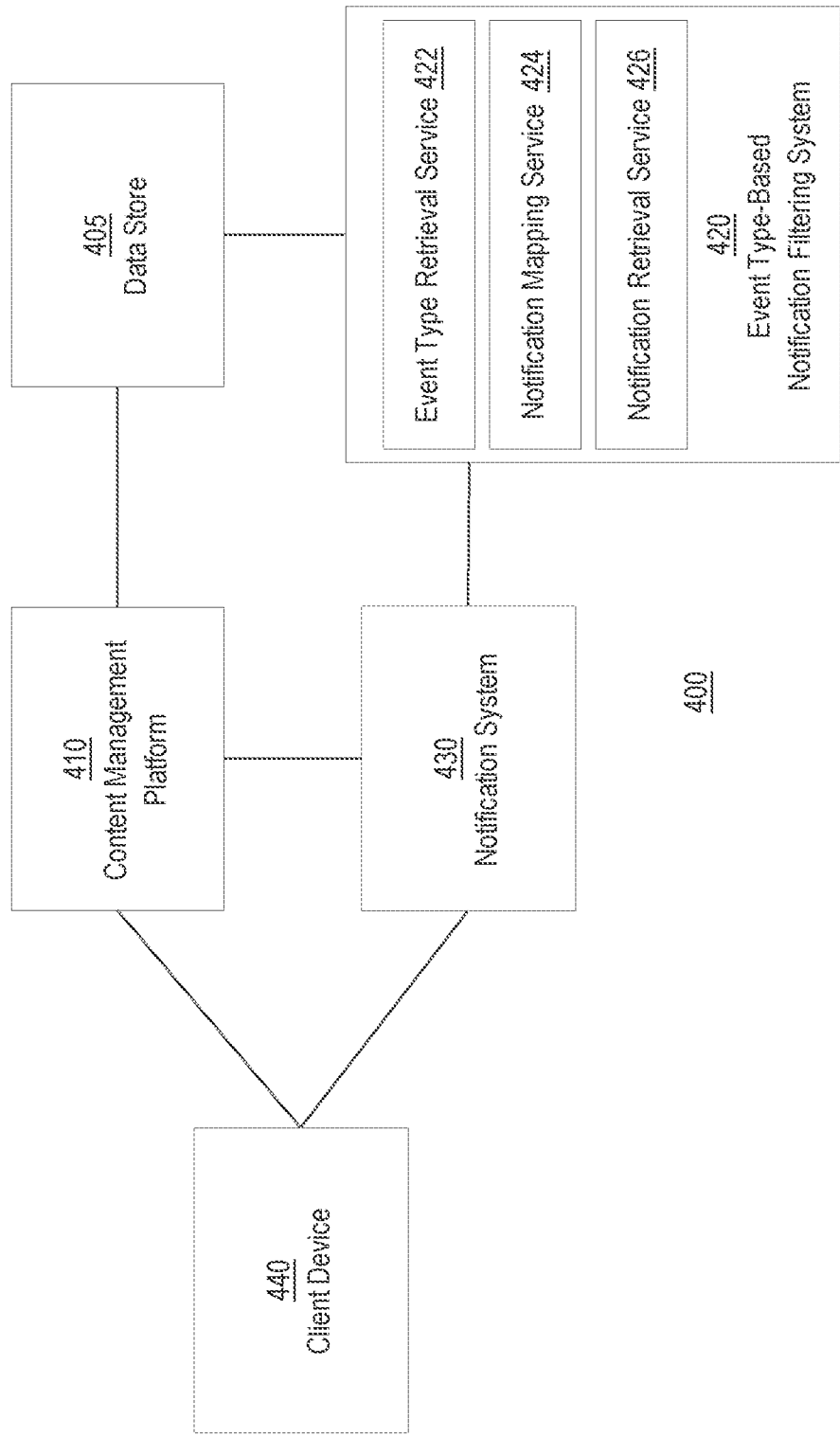

EVENT TYPE-BASED NOTIFICATION FILTERING

TECHNICAL FIELD

The present disclosure relates generally to network-transferred electronic content and, more particularly to, filtering of notification-type electronic content for a recipient based on event type.

BACKGROUND

Content management systems are designed to provide content items to users for consumption. Content items may represent content such as photos, video, job posts, news articles, documents, user posts, audio, and many more. Content management systems may implement a notification system to generate and send notifications to recipients informing the recipients of pending content items regarding events or actions associated with other entities (e.g., users, organizations) that may be of interest to the recipients. For example, a first user, which has a connection to a second user, may publish or share a content item. The notification system may identify that the second user may be interested in the content item published or shared by the first user and send a notification message to the second user. Upon receiving the notification message, the second user may initiate a user session with the content management system in order to interact with the content item published or shared by the first user.

Recipients with a large number of user connections may have a high influx of notification messages. Conventional notification systems may reduce the number of received notification messages by allowing users to disconnect from particular users. However, this approach results in a recipient not receiving any notification messages from a particular disconnected user, some of which may be of interest to the recipient. Conventional notification systems may also reduce the number of received notification messages by allowing users to set and apply filters in a separate settings or preferences application within the content management system. However, this approach requires users to exit the current notifications interface and navigate to a separate application. Furthermore, the filters provided in the separate settings or preferences applications are usually blanket filters that result in users not receiving a large subset of notification messages. Thus, there is a need for a user-friendly method of reducing high influxes notification messages in content management systems while providing better control and flexibility.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts an example flowchart for event type-based filtering of notification messages for delivery to a client computing device, in an embodiment.

FIG. 4 is a block diagram that depicts a system 400 for event type-based filtering of notification messages optimized for improved user engagement, in an embodiment.

DETAILED DESCRIPTION

Figure 1:
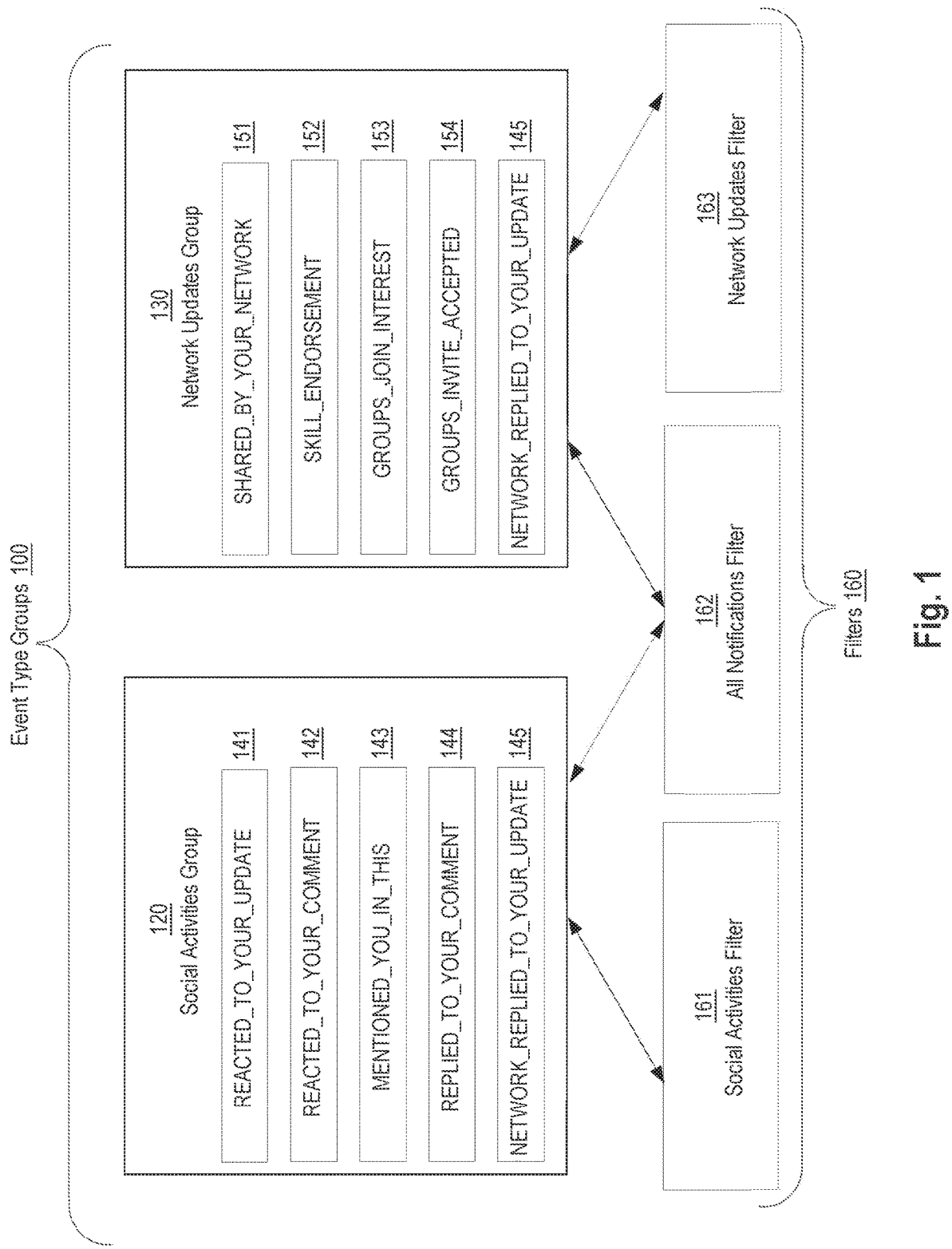
FIG. 1 is a block diagram that depicts an example relationship between event types, event type groups, and filters, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a content management system implements a notification system that generates notification messages for recipient users and that informs the recipient users of pending content of interest. Received notification messages may cause users to initiate new user sessions in order to engage with pending content. The pending content may be content published or interacted with by other connected users or may be content that the recipient users are interested in consuming. In an embodiment, a system causes a plurality of notification messages to be presented on a computing device, such as a smart phone, tablet, or personal computer. The system may identify each notification message of the plurality of presented notification messages to be associated with a particular user. The plurality of presented notification messages may be based on user interactions by the particular user or may be static events related to the particular user's profile. For example, presented notification messages may be based on a reply to a comment by the particular user, a mention of the particular user in a connected user's comment, a work anniversary, or a birthday.

In one embodiment, based on the content, type of user interaction, and/or characteristics of each presented notification message, each notification message is mapped to an event type. In an embodiment, event types that share similar characteristics are grouped together into a set of event types called event type groups. For example, event types "REACTED_TO_YOUR_UPDATE," and "REPLIED_TO_YOUR_COMMENT," may be grouped together in event type group Social Activities Group, while event type "SHARED_BY_YOUR_NETWORK" may be in event type group Network Updates Group. Some event types may be part of more than one event type group. In an embodiment, the plurality of presented notifications messages may include a first notification message of a first event type and a second notification message of a second event type, where the first event type is different than the second event type, the first event type is part of a first event type group, such as Social Activities Group, and the second event type is part of a second event type group, such as Network Updates Group.

A plurality of event type-based filters may then be presented on the computing device. Each presented event type-based filter may be associated with one or more event types, where the one or more event types may be part of the same event type group. A first presented event type-based filter may be associated with one or more first event types of a first event type group, while a second presented event type-based filter may be associated with one or more second event types of a second event type group. For example, a Social Activities Filter may be presented, where the Social Activities Filter is associated with the Social Activities Group that includes event types "REACTED_TO_YOUR_UPDATE" and "REPLIED_TO_YOUR_COMMENT." In some embodiments, an event type-based filter is associated with a plurality of event type groups. In another embodiment, an event type-based filter is associated with all existing event type groups.

The system may receive input that selects a first event type-based filter. The input may be received in response to a selection of a graphical element by a particular user on a computing device. One or more first event types of a first event type group may be identified in response to the system receiving input. In one embodiment, the system receives a plurality of inputs that selects a plurality of event type-based filters, where each event type-based filter is associated with a different event type group. Based on the identified one or more first event types of a first event type group, the system may then identify, from a plurality of presented notification messages, a strict subset of the presented notification messages that are of one or more of the one or more first event types, where the one or more first event types may be of a first event type group. For example, in response to the Social Activities Filter being selected, the system may identify notification messages of event types that are part of the event type group Social Activities Group.

Based on the identified strict subset of the plurality of presented notification messages, the system may cause the strict subset of notification messages to be presented on the computing device, without causing any notifications outside of the strict subset to be presented on the computing device.

The disclosed approaches provide advantages over conventional solutions by optimizing the presentation of notification messages using event type-based filtering in order to filter and generate notification messages that are tailored to each recipient based on user priorities for certain notification messages of particular event types. Allowing users to tailor notification messages using event type-based filters increases content management efficiency, information availability, and notification message transparency, which in turn may cause increased user engagement.

Additionally, event type-based notification filtering may result in conservation of processing resources and processing time that may be otherwise dedicated to loading notification messages that may be of lower priority or of no interest to recipients.

Event Type Overview

FIG. 1 is a block diagram that depicts an example relationship between event types 141-145, 151-154, a plurality of event type groups 100, and event type-based filters 160. Each event type group 120, 130 in a plurality of event type groups 100 may represent a set of one or more event types 141-145, 151-154. For example, Social Activities Group 120 is an event type group that comprises a first set of event types 141-145; Network Updates Group 130 is another event type group that comprises a second set of event types 151-154 and 145. Event type-based filters 160 may be associated with one or more sets of event types 141-145, 151-154. For example, Social Activities Filter is a first event type-based filter that is associated with the first event type group 120, which comprises a first set of event types 141-145; Network Updates Filter is another event type-based filter that is associated with the second event type group 130, which comprises a second set of event types 151-154 and 145.

A notification message is a message received by a target user that contains content related to a source user or actions by a source user. For example, target user A may receive a notification containing content stating that it is source user B's birthday. This example notification contains content directly related to source user B, the source user's birthday. In another example, target user A may receive a notification containing content related to actions performed by source user B. Examples of actions performed by source user B may include sharing content, such as sharing a news article, posting a message, and liking or commenting on an article or another user's post. In one embodiment, based on the content, type of user interaction, and/or characteristics of each presented notification message, each notification message is mapped to an event type 141-145, 151-154. Example event types include, but are not limited to "REACTED_TO_YOUR_UPDATE" 141, "REACTED_TO_YOUR_COMMENT" 142, "MENTIONED_YOU_IN_THIS" 143, "REPLIED_TO_YOUR_COMMENT" 144, "NETWORK REACTED_TO_YOUR_UPDATE" 145, "SHARED_BY_YOUR_NETWORK" 151, "SKILL_ENDORSEMENT" 152, "GROUPS_JOIN_REQUEST" 153, "GROUPS_INVITE_ACCEPTED" 154, DATE_REMINDER, and TIME_REMINDER.

In some embodiments, a single notification message is mapped to a plurality of event types. In other embodiments, a notification message is mapped to a generic placeholder event type. The generic placeholder event type may later be replaced with a non-generic placeholder event type. Event types may be created by a user. In another embodiment, event types can be combined using concatenation to form new event types. For example, event type "REACTED_TO_YOUR_COMMENT" 142 and event type "REPLIED_TO_YOUR_COMMENT" 144 may be combined using concatenation to form event type "REACTED_TO_YOUR_COMMENT REPLIED_TO_YOUR_COMMENT." In yet another embodiment, an event type comprises one or more sub-event types. For example, the event type "REACTED_TO_YOUR" may comprise sub-event types "REACTED_TO_YOUR_UPDATE," and "REACTED_TO_YOUR_COMMENT."

One or more event types 141-145, 151-154 may be grouped together based on similar characteristics, similar types of interactions that a user may have with a notification message of a particular event type, similar content within notification messages of a particular event type, or similar types of users which may interact with a notification message of particular event type. For example, a first set of event types 141-145 may be grouped together in Social Activities Group 120 based on the type of interactions that a user may have with notification messages of event types in this group. Similarly, a second set of event types 151-154 and 145 may be grouped together in Network Updates Group 130 based on the similar characteristic of "relating to the user's network" of notification messages of event types in this group.

Some event types may be part of two different event type groups. For example, event type "NETWORK_REACTED_TO_YOUR_UPDATE" 145 is of Social Activities Group 120 and Network Updates Group 130.

In some embodiments, an event type is mapped to a generic placeholder event type group. The event type may later be mapped to a non-generic placeholder event type group. The mapping of event types to event type groups may be performed by a user. In another embodiment, the mapping of event types to event type groups is performed automatically by the content management system based on similar characteristics of the event types.

Event type groups may be combined to form new event type groups. Event type groups may also comprise of sub-event type groups. For example, Social Activities Group 120 may comprise of a first sub-event type group Reactions Group comprising of event types "REACTED_TO_YOUR_UPDATE" 141, "REACTED_TO_YOUR_COMMENT" 142, "NETWORK_REACTED_TO_YOUR_UPDATE" 145 and a second sub-event type group Replies Group comprising of event type "REPLIED_TO_YOUR_COMMENT" 144.

Each event type-based filter of one or more event type-based filters 160 is associated with one or more event type groups. For example, Social Activities Filter 161 (a first event type-based filter) may be associated with event type group 120, Network Updates Filter 163 (a second event type-based filter) may be associated with event type group 130, and All Notifications Filter 162 (a third event type-based filter) may be associated with both event type group 120 and event type group 130.

Event Type-Based Filtering Process Overview

FIG. 2 depicts an example flowchart for event type-based filtering of notification messages for delivery to a client computing device. Process 200 may be performed by a single program or multiple programs. The operations of process 200 be implemented using processor-executable instructions that are stored in computer memory. For purposes of providing a clear example, the operations of FIG. 2 are described as performed by components of system depicted in FIG. 4 and system 500 of FIG. 5. For the purposes of clarity process 200 is described in terms of a single entity.

In operation 205, process 200 causes a plurality of notification messages to be presented on a computing device. As mentioned previously, notification messages may be based on user interactions by the particular user or may be static events related to the particular user's profile. The plurality of notification messages may be presented in a sequential chronological order based on the time of receipt by the computing device or the time of creation of the corresponding notifications. In one embodiment, summaries of the notification messages are presented on the computing device accompanied by one or more representative graphical elements.

In one embodiment, based on the content, type of user interaction, and/or characteristics of each presented notification message, each notification message is mapped to an event type. Event types may be associated with a particular user, such as the source user. Event types may be associated with online events, which may represent actions performed by a particular user during a user session. Examples of online events may include when a particular user shares content or likes or comments on other users' posts. Alternatively, event types may be associated with offline events, which may represent upcoming user milestones, such as an upcoming birthday or work anniversary. In one embodiment, event types that share similar characteristics are grouped to together into a set of event types called an event type group. An example relationship between event types 141-145, 151-154, a plurality of event type groups 100, and event type-based filters 160 is illustrated in FIG. 1.

In operation 210, process 200 causes a plurality of event type-based filters to be presented on the computing device. Filters may be associated with groupings of notification messages of certain event types that may be of particular interest to a user. In one embodiment, event type-based filters are associated with one or more event type groups that comprise one or more event types. For example, event type-based filters may include, but are not limited to, a Social Activities Filter, a Network Updates Filter, and a Recommendations Filter.

In some embodiments, graphical representations of the event type-based filters are presented concurrently with the plurality of presented notification messages. For example, a user may view, in the same interface, a list of available event type-based filters displayed next to a list of notifications, without the user having to switch to a new interface. In another embodiment, graphical representations of the event type-based filters may be presented as a pop-up window that appears in the same interface as the plurality of notification messages, again, without the user having to switch to a new interface. The graphical representation of event type-based filters may be initially hidden from the interface and only caused to be displayed in response to inputs to the system. For example, a pop-up window comprising a list of event type-based filters may initially be hidden to a user and only caused to be displayed in response to input (e.g., selection of a graphical element on a touchscreen display) by the user.

In operation 215, process 200 receives inputs that selects one or more event type-based filters. In one embodiment, users may select one or more event type-based filters by selecting a displayed graphical element of the respective event type-based filter. For example, a check box may be presented for each displayed event type-based filter in which a user may select. In another embodiment, graphical elements of selected event type-based filters may be highlighted to provide indication that one or more particular event type-based filters are selected. After the selection of event type-based filters, the graphical representation of the presented event type-based filters may automatically be hidden from the interface. In another embodiment, after the selection of one or more event type-based filters, the graphical representation of the presented event type-based filters remains concurrently displayed with the plurality of notification messages, with graphical elements indicating which event type-based filters are currently applied. In yet another embodiment, selected event type-based filters are indicated in the interface using a text heading. For example, after the selection of the Social Activities Filter, the text heading "View: Social Activities" may be displayed in the interface to indicate that the Social Activities Filter is currently applied.

In operation 220, in response to receiving input that selects the one or more event type-based filters in operation 215, process 200 identifies the one or more event type groups associated with the respective selected event type-based filters. Subsequently, each individual event type within each identified event type group may also be identified.

In operation 225, process 200 identifies, from among the plurality of presented notification messages, a strict subset of the plurality of presented notification messages that are of at least one of the event types within an event type group associated with the selected event type-based filters.

In operation 230, process 200 causes the strict subset of the plurality of presented notification messages to be presented on the computing device without causing any notification messages outside of the strict subset to be presented on the computing device. The strict subset of the plurality of presented notification messages may be presented in chronological order. In an embodiment, if a plurality of event type-based filters is selected, then the displayed notification messages may be displayed in groups based on the corresponding event type-based filters. For example, if Social Activities Filter 161 and Network Updates Filter 163 are selected, then notification messages corresponding to event types in Social Activities Group 120 are presented first and notification messages corresponding to event types in Network Updates Group 130 are presented second, or the two different sets of notification messages are otherwise organized separately in a view (e.g., a webpage). In another embodiment, the presentation order of notification messages is based on filter relevancy rankings that are provided by users. For example, if a user ranks Network Updates Filter 163 higher than Social Activities Filter 161, then notification messages corresponding to event types in the Network Updates Group 130 are presented first and notification messages corresponding to event types in Social Activities Group 120 are presented second.

Interface Examples

Figure 3A:
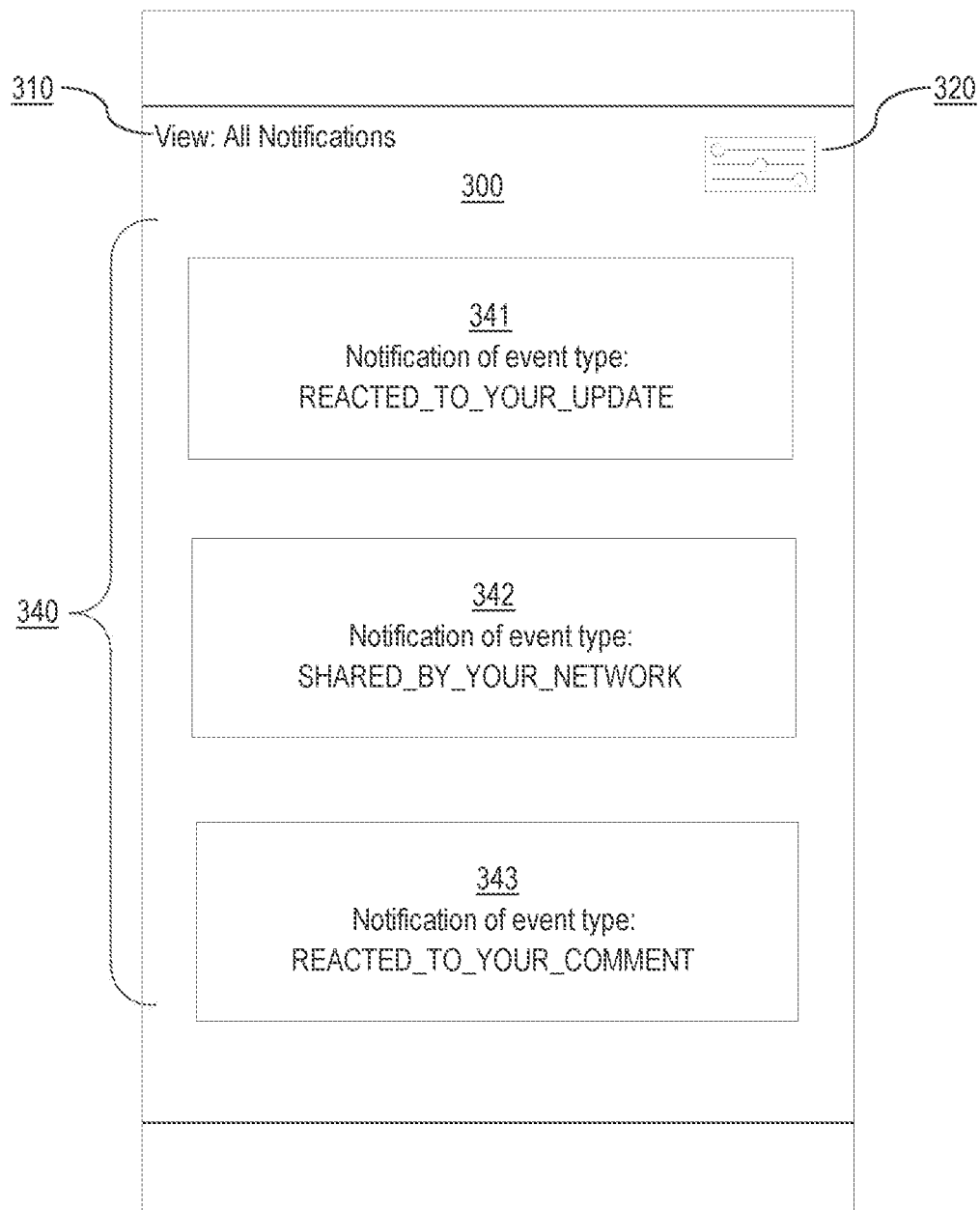
FIG. 3A depicts an example interface showing a plurality of notification messages prior to the application of one or more filters, in an embodiment.

FIG. 3A depicts an example interface showing a plurality of notification messages 340 prior to the application of one or more event type-based filters. A text heading 310 may display default heading "View: All Notifications" to indicate that the notification message interface 300 is currently set to display all notification messages 340 without the application of any event type-based filters. In this example, the notification message interface 300 may be set to display notification messages 340 of all event types. For example, a first presented notification message 341 may be of event type REACTED_TO_YOUR_UPDATE, a second presented notification message 342 may be of event type SHARED_BY_YOUR_NETWORK, and a third presented notification message 343 may also be of event type REACTED_TO_YOUR_UPDATE.

In one embodiment, each of notification messages 340 comprises a summary of the content of the notification message and/or a graphical representation associated with the notification message. In a related embodiment, each notification messages 340 comprises a graphical element indicating the one or more event type of the corresponding notification message. (Thus, an actual notification message might not spell out "event type" or the name of the event type corresponding to the notification.)

A graphical element 320 may be selected to trigger the presentation of applicable event type-based filters. In a related embodiment, the presentation of applicable event type-based filters is triggered using touch motion controls. For example, a window comprising a list of applicable event type-based filters may be presented in response to an upwards swiping motion on a touch screen of a computing device. In one embodiment, applicable event type-based filters are only presented in the interface if a request is received based on user input.

Figure 3B:
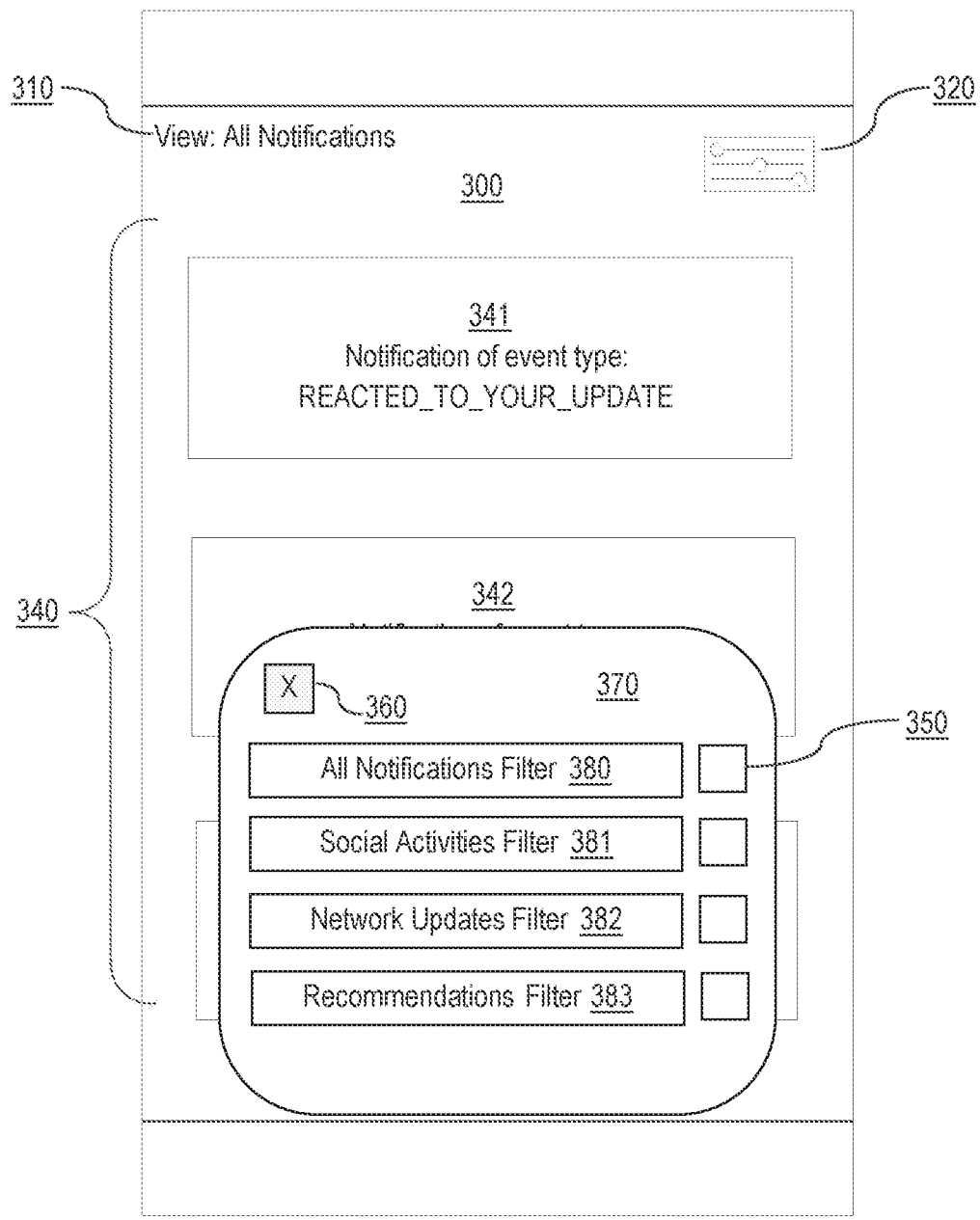
FIG. 3B depicts an example interface showing a plurality of applicable event-type based filters, in an embodiment.

FIG. 3B depicts an example interface showing a plurality of applicable event-type based filters. In response to a request to present applicable event type-based filters, such as in response to the selection of graphical element 320, a graphical representation of applicable event type-based filters may be concurrently presented in the same interface. For example, a pop-up window 370 comprising a list of event type-based filters 380-383 may be presented, in which the pop-up window 370 is layered over the notification message interface 300. In some embodiments, each presented event type-based filter 380-383 is accompanied with a short description of the corresponding event type-based filter. In one embodiment, the short description comprises a list of the event types associated with the corresponding filter. In a related embodiment, each presented event type-based filter 380-383 is accompanied with the number of presented notifications associated with the corresponding event type-based filter. For example, if there are a total of 50 notification messages of event types associated with the Social Activities Filter, the number "50" may be displayed next to the graphical representation of the Social Activities Filter 381.

The presentation of event type-based filters 370 may also comprise graphical elements 350 to facilitate the selection of event type-based filters 380-383. A user may select one or more event type-based filters 380-383 by selecting the corresponding graphical elements 350. To provide indication of selection, the corresponding graphical element may be transformed after selection. For example, each event type-based filters 380-383 may each have a corresponding check box. A user may select one or more check boxes 350 to apply the corresponding event type-based filters 380-383. After selection, the corresponding check box will transform from an initial empty box to a checked box to indicate selection.

Additionally or alternatively, corresponding portions of the graphical representation of the event type-based filters 370 may be highlighted to indicate the selection of one or more event type-based filters 380-383. While the graphical representation of event type-based filters 370 is being presented, portions of the notification message interface 300 may not be interactable. In one embodiment, while the graphical representation of event type-based filters 370 is being presented, portions of the notification message interface 300 may be darkened to indicate that the notification message interface 300 may not be interactable.

After completing the selection of applicable event type-based filters, a graphical element 360 within the graphical representation of event type-based filters 370 may be selected to indicate the completion of the selection. After the selection of the graphical element 360, the graphical representation of event type-based filters 370 may be hidden, allowing a complete notification message interface 300 to be presented and interactable. In one embodiment, the graphical representation of event type-based filters 370 is hidden in response to a downwards swiping motion on a touch screen of a computing device. In another embodiment, the graphical representation of event type-based filters 370 is hidden in response to the selection of a single event type-based filter.

Figure 3C:
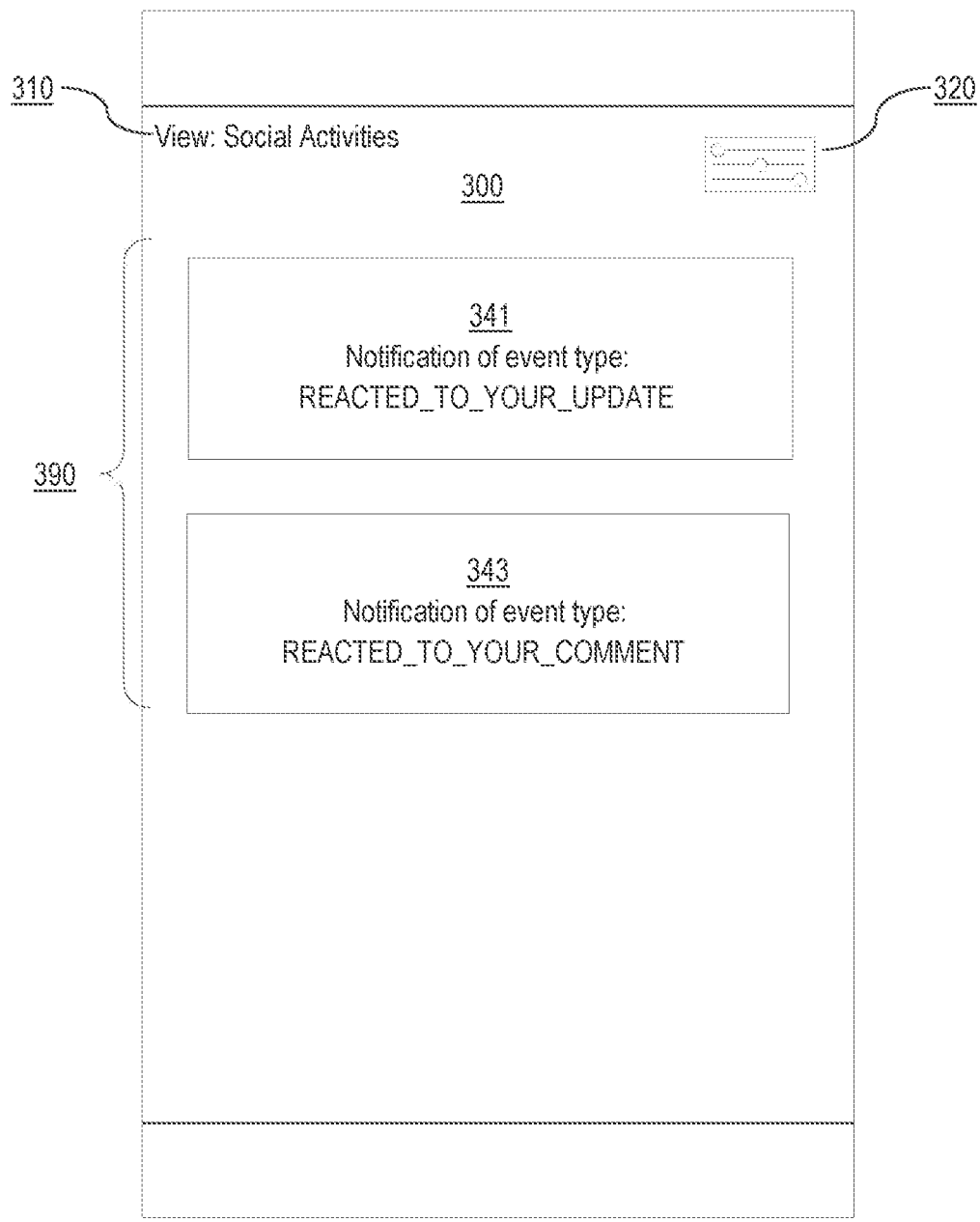
FIG. 3C depicts an example interface showing a plurality of notification messages after the application of an event-type based filter, in an embodiment.

FIG. 3C depicts an example interface showing a plurality of notification messages after the application of an event-type based filter. After the selection of one or more event type-based filters, a text heading 310 may be displayed indicating the corresponding selected and applied event type-based filters. In the example depicted in FIG. 3C, the text heading 310 may display "View: Social Activities" to indicate that the Social Activities Filter 381 is selected and currently applied to the plurality of presented notification messages. In response to the application of one or more event type-based filters, the notification message interface 300 may be updated to only show notification messages 390 of event types corresponding to the selected one or more event type-based filters. For example, in FIG. 3C, after the selection of the Social Activities Filter 381, the notification message interface 300 may be updated to show only notification messages 341, 343 that are of event types within Social Activities Group 120 which is associated with the Social Activities Filter 381.

Figure 3D:
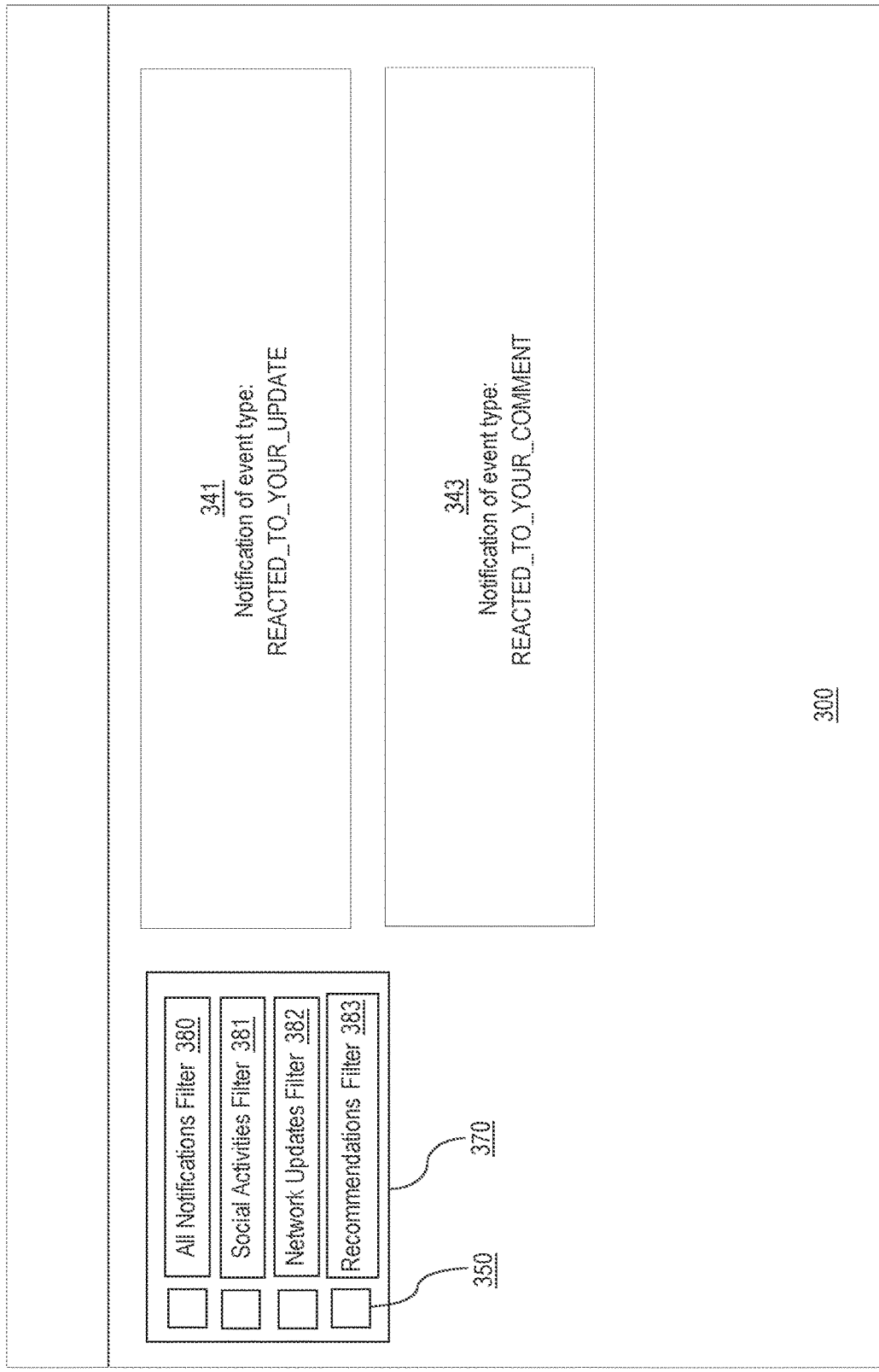
FIG. 3D depicts another example interface showing a plurality of notification messages after the application of an event-type based filter, in an embodiment.

FIG. 3D depicts another example interface showing a plurality of notification messages after the application of an event-type based filter. In the example interface depicted in FIG. 3D, the graphical representation of event type-based filters 370 may always be concurrently presented with notification message interface 300. Thus, in this embodiment, the graphical representation of event type-based filters 370 is not layered over the notification message interface 300. The notification message interface 300 may be interactable while the graphical representation of event type-based filters 370 is presented.

In some embodiments, each presented notification message 341-343 may comprise a selectable graphical element which, when selected, applies an event type-based filter associated with the corresponding notification message. For example, a graphical representation of a notification message of event type REACTED_TO_YOUR_UPDATE 341 may include a selectable graphical element within which, when selected, applies Social Activities Filter 381 to the plurality of presented notification messages within the notification message interface 300. In another embodiment, each presented notification message 341-343 may comprise a selectable graphical element within which, when selected, applies an event type-based filter containing the particular event type of the corresponding notification message. For example, a graphical representation of a notification message of event type REACTED_TO_YOUR_UPDATE 341 may include a selectable graphical element within which, when selected, applies event type-based filter which causes only notification messages of event type REACTED_TO_YOUR_UPDATE to be presented in the notification message interface 300.

In one embodiment, each presented notification message 341-343 may comprise a selectable graphical element which, when selected, applies an event type-based filter which removes all notification messages of event types associated with the corresponding notification message. For example, a graphical representation of a notification message of event type SHARED_BY_YOUR_NETWORK 342 may include a selectable graphical element within which, when selected, applies an event type-based filter which removes all notification messages associated with the Network Updates Filter 382 from the plurality of presented notification messages in the notification message interface 300. In another embodiment, each presented notification message 341-343 may comprise a selectable graphical element within which, when selected, applies an event type-based filter which removes all notification messages containing the particular event type of the corresponding notification message. For example, a graphical representation of a notification message of event type SHARED_BY_YOUR_NETWORK 342 may include a selectable graphical element within which, when selected, applies an event type-based filter which removes all notification messages of event type SHARED_BY_YOUR_NETWORK from the notification message interface 300.

In yet another embodiment, users may rank each event type-based filter in order of relevancy. The ranking of each event-type based filter may determine the order in which notification messages are presented. For example, in the graphical representation of event type-based filters 370, users may rank the presented event type-based filters by selecting numbers displayed next to each event type-based filter. Selecting "1" for the Social Activities Filter 381, "2" for the Recommendations Filter 383, and "3" for the Network Updates Filter 383 may cause the notification messages associated with each event type-based filter to be presented in the corresponding ranked order.

System Overview

FIG. 4 is a block diagram that depicts a system 400 for event type-based filtering of notification messages optimized for improved user engagement. System 400 may represent a content platform that includes a data store 405, a content management platform 410, an event type-based notification filtering system 420, a notification system 430, a client device 440. Although a single content management platform is depicted, system 400 may include additional content management platforms. Similarly, system 400 may include additional notification systems.

In an embodiment, the content management platform 410 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to content items and/or provide the content items to the user. For example, the content management platform 410 may allow a user to consume, upload, search for, approve of (e.g. "like"), dislike, and/or comment on content items.

Examples of content items may include, but are not limited to, messages, articles, media such as pictures, video, and sound clips, invitations to connect, and any other event or object that may be consumed by a user. A user session may refer to a period of activity between when a user logs into the content platform and the user logs out of the content platform. For example, Jane Smith may initiate a user session by logging into the content platform. Jane Smith may visit several pages, and then end her user session by logging out or by not interacting with the content platform for a period of time.

In an embodiment, the notification system 430 generates notification messages for users and sends the notification messages to client device 440 for corresponding users. The notification system 430 may receive a request, from the content management platform 410, that identifies one or more users selected to receive a notification message. The notification system 430 may be enabled to generate various different types of notification messages of various event types. In an embodiment, the notification system 430 is implemented on a server. In an embodiment, the mapping between event type-based filters and the corresponding event type groups is generated and stored at the notification system 430. The mapping between event type-based filters and the corresponding event type groups may be implemented using one or more mapping data structures stored at the notification system 430.

The notification system 430 may comprise an application programming interface (API) to provide a communication protocol between the client device 440, the content management system 410, and the event type-based filtering system 420. To present a list of event type-based filters to the client computing device, a GET call may be sent to the API in which a URL may look like:
https://www.linkedin.com/voyager/api/notifications/dash/filters?decorationId=[RECIPE_ID]

A selection of one or more event type-based filters by a user on a client device may trigger a server request, according to the API, to the notification system 430. In one embodiment, the server request provides event type-based filter information to the server through query parameters in notification segment calls as well as subsequent notification pagination calls. For example, the URL of a notification segment call to the server may look like:
https://www.linkedin.com/voyager/api/notifications/dash/segments?decorationId=[RECIPE_ID]
&appName=VOYAGER&filters=List(FILTER_ONE)

The URL of a notification pagination call may look like:
https://www.linkedin.com/voyager/api/notifications/dash/cards?q=notifications&count=20&start=0&segmentUrn=[SEGMENT_URN]&decorationId=[RECIPE_ID]
&filters=List(FILTER_ONE)

In response to receiving the server request, the notification system 430 may, using the API, retrieve all event types using the event type retrieval service 422 within the event type-based filtering system 420.

Using the mapping between event type-based filters and the corresponding event type groups, the notification system 430 may then use the notification mapping service 424, within the event type-based filtering system 420, to retrieve, from among all event types, particular event types associated with selected event type-based filters.

Once the notification system 430 has finalized a list of all particular event types associated with selected event type-based filters, the notification system 430 may make a call to the notification retrieval service 426 within the event type-based filtering system 420. Based on the finalized list of all particular event types associated with selected event type-based filters, the notification retrieval service 426 may provide to the notification system 430 all notification messages of one or more particular event types associated with selected event type-based filters. The notification system 430 may then provide, to the client device 440, event type-based filtered results comprising notification messages of one or more particular event types associated with user-selected event type-based filters.

In an embodiment, client device 440 may represent computing devices including, but not limited to, desktop computers, laptop computers, tablet computers, wearable devices, video game consoles, and smartphones. Client device 440 may represent devices users may use to receive notification messages and initiate new user sessions.

Tracking of Filter and Notification Data

In an embodiment, the content management platform 410 of FIG. 4 may track user sessions and store related user session metrics in the data store 405. User session metrics may include, but are not limited to, frequency of selection of event type-based filters by a particular user, frequency of selection of event type-based filters by all users, number of users using one or more event type-based filters, frequency of usage of particular event types within selected event type-based filters by a particular user, frequency of usage of particular event types within selected event type-based filters by all users, which event type-based filters are selected by users, information about users who use one or more event type-based filters, time and date of the selection of particular event type-based filters, time and date of each user session, the user who initiated each user session, the duration of each user session, number of actions performed and number of pages visited during each user session, and number and type of notifications messages received by each user. In one embodiment, tracking metrics are determined by monitoring tracking events fired in response to user selection of event type-based filters. In another embodiment, each event type-based filter is associated with a particular tracking event which may be separately monitored to determine tracking metrics for each event type-based filter.

In an embodiment, the data store 405 may represent data storage that stores tracking data, user session metrics, aggregated user session metrics, and event type-related data. The stored data may be accessed by the content management platform 410 and the notification content selection system 420.

Inconsistent Notification Prevention

After the selection and application of one or more event type-based filters, a user may receive one or more notification messages that are not of the event type of any event type group associated with the selected one or more event type-based filters. Thus, the user may not receive adequate notification of the newly received one or more notification messages, resulting in an inconsistent notification experience. In one embodiment, to prevent inconsistent notification experiences, when client device 440 establishes a new session with notification system 430, all previously selected one or more event type-based filters may be automatically unselected. In another embodiment, when client device 440 establishes a new session with notification system, an "All Notifications Filter" may be automatically selected.

Event Type-Based Filter Modification

Based on tracking data and user usage patterns, event type-based filters may be added, removed, or modified.

In one embodiment, the order of presentation of event type-based filters is modified based on user usage patterns. For example, in FIG. 3B, the order of presentation event type-based filters in the graphical representation of event type-based filters 370 may be modified based on user usage patterns. More frequently used event type-based filters may be modified to appear at the top of the graphical representation of event type-based filters 370 while less frequently used event type-based filters may appear at the bottom. Alternatively, users may manually modify the order of presentation of event type-based filters.

Event type groups associated with event type-based filters may also be modified. Event types may be added or removed from particular event type groups. In one embodiment, event types are automatically added or removed from particular event type groups based on tracking data and user usage patterns. Alternatively, event types may be added or removed from particular event type groups manually by users. In another embodiment, a default event type-based filter is set when the client device 440 establishes a new session with notification system 430. For example, a user may set the Social Activities Filter as the default filter so that the Social Activities Filter is automatically applied to notification messages in the notification message interface upon establishing a new session with notification system 430. The default event type-based filter may also be automatically set by the system based on tracking data and user usage patterns.

Event type-based filters may be added or removed. Users may remove an event type-based filter so that it may no longer be presented in the graphical representation of event type-based filters 370. Users may also recover removed event type-based filters or add new event type-based filters. For example, users may add a previously non-existing event type-based filter by associating the new event type-based filter with an event type group comprising one or more event types. Event types may be freely added or removed from the event type group associated with the newly added event type-based filter. For example, using an interface which includes graphical representations of event types groups 120, 130 and event types 141-145, 151-154, a user may add new event type ALSO_COMMENTED_ON_THIS to Social Activities Group 120. The user, using the same interface, may also remove event type NETWORK_REPLIED_TO YOUR_UPDATE 145 from Network Updates Group 130. In one embodiment, event type-based filters are automatically added or removed based on tracking data and user usage patterns. Alternatively, event type-based filters may be manually added or removed by users.

Users may create event type-based filters that enable users to receive notification messages from particular networks or particular other users that they want to hear from more regularly. This event type-based filter assists users who may have a large number of connected users or networks, but who want to only interact with a smaller subset of connected users or networks. For example, if a user only wishes to view update notification messages from connected user 'John Smith,' the user may create new event type-based filter John Smith Updates Filter. The newly-created John Smith Updates Filter may be associated with a single event type PEOPLE_FOLLOW_JOHN_SMITH, where update notification messages from John Smith are of the event type PEOPLE_FOLLOW_JOHN_SMITH. In one embodiment, the system automatically generates one or more event type-based filters that are associated with notification messages from networks or connected users for which the user has a high affinity.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
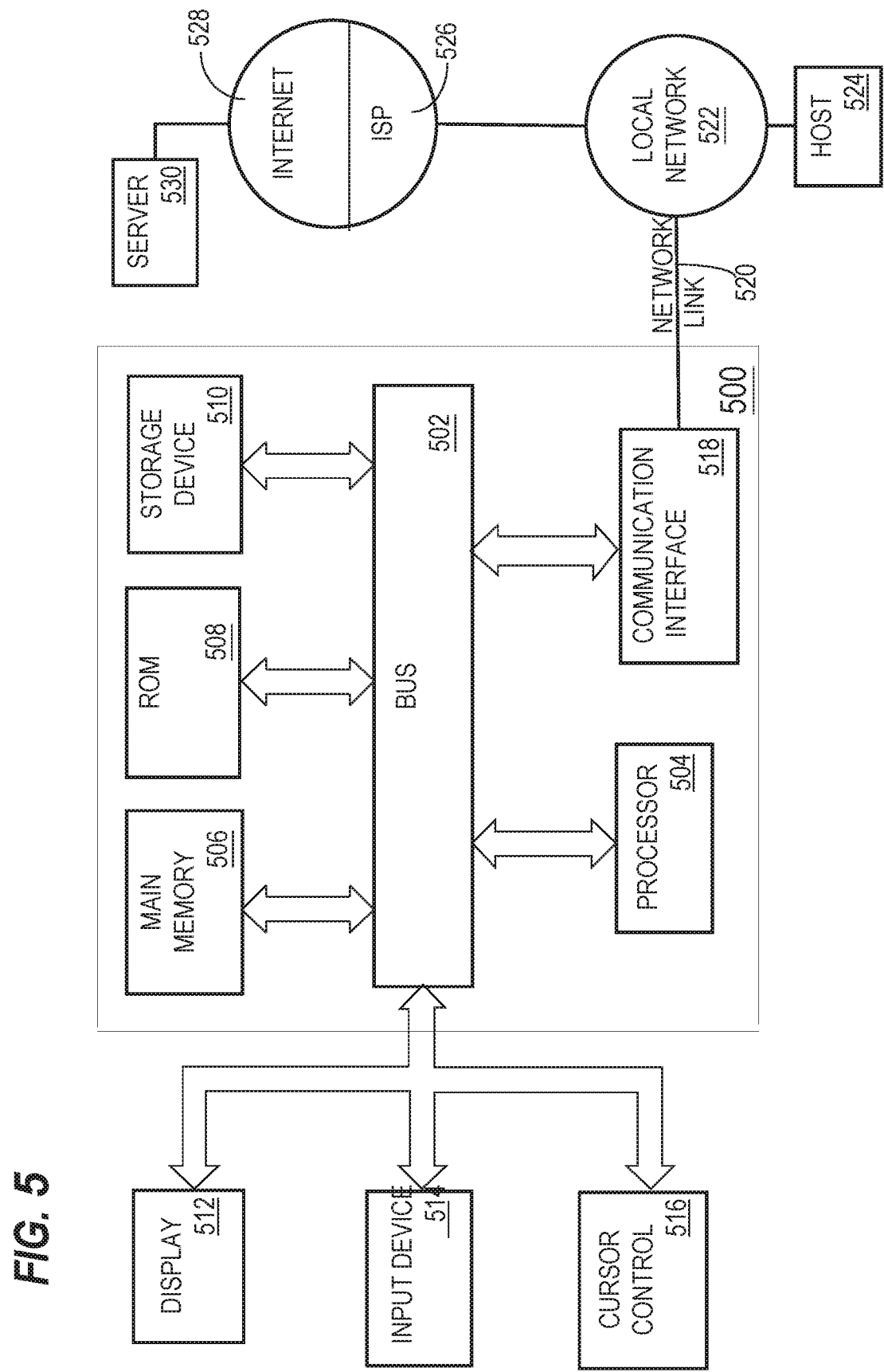
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
creating one or more first event types automatically based on one or more usage patterns of a particular user on a content platform;
associating one or more second event types with the particular user;
causing a plurality of notifications comprising a first notification and a second notification to be presented on a display of a computing device;
mapping the first notification to the one or more first event types;
mapping the second notification to the one or more second event types;
mapping the first event type to a first filter;
mapping the second event type to a second filter;
causing a plurality of filters comprising the first filter and the second filter to be presented on the display;
receiving input that selects the first filter;
mapping the first filter to the one or more first event types; and
filtering the second notification from the display;
wherein the method is performed by one or more computing devices.

2. The method of claim 1, wherein causing the plurality of filters to be presented comprises causing the plurality of filters to be presented concurrently with a subset of the plurality of notifications.

3. The method of claim 1, wherein:
the input is a second input;
a view that includes the plurality of notifications includes a graphical element,
the method further comprising receiving a first input that selects the graphical element;
causing the plurality of filters to be presented is performed in response to receiving the first input;
the plurality of filters is presented on the computing device concurrently with a subset of the plurality of notifications;
the plurality of filters ceases to be presented when a strict subset of the plurality of notifications is presented on the computing device.

4. The method of claim 1, wherein receiving the input that selects the first filter comprises:
in response to receiving the input, receiving, at a server, a server request that identifies the first filter that is associated with the one or more first event types;
retrieving, by the server, a plurality of event types that includes the one or more first event types and the one or more second event types;
selecting, by the server, a subset of the plurality of event types based on the first filter, wherein the subset of the plurality of event types comprises the one or more first event types;
retrieving, by the server, from among the plurality of notifications, a subset of the plurality of notifications that is of one or more event types of the subset of the plurality of event types;
providing, by the server, the subset of the plurality of notifications to the computing device.

5. The method of claim 1, further comprising:
for one or more computing devices, storing tracking data that indicates, for each filter of the plurality of filters, a number of inputs that selects each filter of the plurality of filters.

6. The method of claim 1, further comprising:
for one or more first computing devices, storing first tracking data that indicates, for each of the one or more first event types, a first number of presented notifications of the one or more first event types of a first plurality of notifications presented on the one or more first computing devices;
for one or more second computing devices, storing second tracking data that indicates, for each of the one or more second event types, a second number of presented notifications of the one or more second event types of a second plurality of notifications presented on the one or more second computing devices.

7. The method of claim 1, further comprising:
in response to a request to cause a second plurality of notifications to be presented on the computing device, determining whether one or more filters are selected;
in response to determining that one or more filters are selected, automatically unselecting the one or more filters prior to causing the second plurality of notifications to be presented on the computing device.

8. The method of claim 1, wherein the one or more first event types or the one or more second event types comprise one of more of:
a reaction event type;
a comment event type;
a user mention event type;
a share content event type;
an endorsement event type;
a join group request event type;
a date event type;
a time event type;
an update event type; or
an upload content event type.

9. The method of claim 1, wherein the plurality of filters comprises two or more of:
a social activities filter;
a network updates filter;
a recommendations filter;
an all notifications filter;
a personal updates filter;
a connected user filter;
a news filter; or
an alerts filter.

10. A system comprising:
one or more processors;
one or more storage media storing instructions which, when executed by one or more processors, cause:
creating one or more first event types automatically based on one or more usage patterns of a particular user on a content platform;
associating one or more second event types with the particular user;
causing a plurality of notifications comprising a first notification and a second notification to be presented on a display of a computing device;
mapping the first notification to the one or more first event types;
mapping the second notification to the one or more second event types;
mapping the first event type to a first filter;
mapping the second event type to a second filter;
causing a plurality of filters comprising the first filter and the second filter to be presented on the display;
receiving input that selects the first filter;
mapping the first filter to the one or more first event types; and
filtering the second notification from the display.

11. The system of claim 10, wherein:
the one or more first event types are a plurality of first event types that includes a third event type and a fourth event type that is different than the third event type;
the plurality of notifications includes a third notification of the third event type and a fourth notification of the fourth event type.

12. The system of claim 10, wherein causing the plurality of filters to be presented comprises causing the plurality of filters to be presented concurrently with a subset of the plurality of notifications.

13. The system of claim 10, wherein:
the input is a second input;
a view that includes the plurality of notifications includes a graphical element; and
wherein the instructions, when executed by the one or more processors, cause:
receiving a first input that selects the graphical element;
causing the plurality of filters to be presented is performed in response to receiving the first input;
the plurality of filters is presented on the computing device concurrently with a subset of the plurality of notifications;
the plurality of filters ceases to be presented when a strict subset of the plurality of notifications is presented on the computing device.

14. The system of claim 10, wherein receiving the input that selects the first filter comprises:
in response to receiving the input, receiving, at a server, a server request that identifies the first filter that is associated with the one or more first event types;
retrieving, by the server, a plurality of event types that includes the one or more first event types and the one or more second event types;
selecting, by the server, a subset of the plurality of event types based on the first filter, wherein the subset of the plurality of event types comprises the one or more first event types;
retrieving, by the server, from among the plurality of notifications, a subset of the plurality of notifications that is of one or more event types of the subset of the plurality of event types;
providing, by the server, the subset of the plurality of notifications to the computing device.

15. The system of claim 10, wherein the instructions, when executed by the one or more processors, further cause:
for one or more computing devices, storing tracking data that indicates, for each filter of the plurality of filters, a number of inputs that selects each filter of the plurality of filters.

16. The system of claim 10, wherein the instructions, when executed by the one or more processors, further cause:
for one or more first computing devices, storing first tracking data that indicates, for each of the one or more first event types, a first number of presented notifications of the one or more first event types of a first plurality of notifications presented on the one or more first computing devices;
for one or more second computing devices, storing second tracking data that indicates, for each of the one or more second event types, a second number of presented notifications of the one or more second event types of a second plurality of notifications presented on the one or more second computing devices.

17. The system of claim 10, wherein the instructions, when executed by the one or more processors, further cause:
   in response to a request to cause a second plurality of notifications to be presented on the computing device, determining whether one or more filters are selected;
   in response to determining that one or more filters are selected, unselecting the one or more filters prior to causing the second plurality of notifications to be presented on the computing device.

18. The system of claim 10, wherein the one or more first event types or the one or more second event types comprise one of more of:
   a reaction event type;
   a comment event type;
   a user mention event type;
   a share content event type;
   an endorsement event type;
   a join group request event type;
   a date event type;
   a time event type;
   an update event type; or
   an upload content event type.

19. The system of claim 10, wherein the plurality of filters comprises two or more of:
   a social activities filter;
   a network updates filter;
   a recommendations filter;
   an all notifications filter;
   a personal updates filter;
   a connected user filter;
   a news filter; or
   an alerts filter.

20. The method of claim 1, further comprising:
   after causing a strict subset to be presented and removing one or more notifications from presentation on the computing device, in response to receiving second input that selects the first filter, causing the one or more notifications to be presented on the computing device.

21. The method of claim 1, wherein at least one of the one or more first event types or at least one of the one or more second event types is associated with a particular user of the computing device.

22. The method of claim 1, further comprising:
   automatically unselecting all selected filters in response to the computing device establishing a new session.

23. The method of claim 1, further comprising:
   responsive to input selecting one or more unselected selectable elements, applying corresponding one or more filters; and
   responsive to input unselecting one or more selected selectable elements, removing corresponding one or more filters.

* * * * *